Patented Mar. 25, 1952

2,590,570

UNITED STATES PATENT OFFICE 2,590,570

PREPARATION OF STABILIZED TALL OIL NITRILES

Stearns T. Putnam, Wilmington, Del., assignor to Hercules Powder Company, Wilmington, Del., a corporation of Delaware No Drawing. Application March 7, 1950, Serial No. 148,259

7 Claims. (Cl. 260—97.5)

This invention relates to a process for the preparation of stabilized tall oil nitriles and to the novel stabilized tall oil nitriles produced thereby.

Tall oil nitrile, one component of which is abietonitrile, has been prepared heretofore by heating tall oil with gaseous ammonia in the presence of a dehydrating catalyst such as silica gel. In U. S. 2,023,337 to Nicodemus, there is disclosed the reaction of tall oil in the liquid phase with ammonia gas at a temperature of about 350° C. in the presence of silica gel as a dehydration catalyst so as to form a mixture of nitriles of resin and fatty acids. It is well known that fatty acids may be converted to the corresponding nitriles by reaction with ammonia at elevated temperature not only in the presence of a catalyst but also in its absence. However, Jolly in U. S. 2,380,531, distinguishes tall oil, which is a mixture of resin acids and fatty acids, from fatty acids in the prior art processes for conversion of fatty acids to fatty acid nitriles, in that for best results tall oil must be treated with ammonia at elevated temperatures under such conditions that the time of contact is relatively short and a catalyst is used. The preferred method of Jolly is substantially that of Nicodemus. Jolly, not only in U. S. 2,380,531, but also in U. S. 2,490,271, emphasizes the differences in the properties of tall oil nitriles made by different processes with respect to their utility in a sulfurization process. Tall oil nitriles also differ in their utility in other processes. For instance, some samples of tall oil nitrile show good plasticizing action for such vinyl polymers as polystyrene, polyvinyl chloride, polyvinyl acetate-chloride, and butadiene polymers and copolymers. However, their use is surrounded with difficulties because they cannot successfully be incorporated into all such polymers after polymerization, and it has been suggested that they be incorporated into the monomer prior to polymerization. Difficulties are still encountered, however, due to the fact that tall oil nitrile has a powerful inhibiting action on the polymerization reaction, which requires large excesses of polymerization catalyst. The modified polymerization processes then become uneconomical. Moreover, the excess catalyst required causes polymerization and copolymerization of the tall oil nitrile, thereby detracting from it the plasticizing property intended. Furthermore, the tall oil nitrile not polymerized is vulcanized by the sulfur in the case of elastomers which are vulcanized, and still less tall oil nitrile remains in the form of the plasticizer originally introduced. The cause of these disadvantageous characteristics of tall oil nitrile is not entirely clear or well understood, and means for overcoming them have not been known to the art.

Now in accordance with the present invention, it has been found that stabilized tall oil nitriles are unexpectedly free of the disadvantages of ordinary tall oil nitriles, particularly with respect to their utility as a plasticizer introduced in elastomers prior to polymerization, when produced by contacting a hydrogenated or dehydrogenated tall oil substantially free of abietic acid with ammonia at a temperature within the range of about 250° C. to about 400° C. until substantially the entire tall oil is converted into a stabilized tall oil nitrile substantially free of abietonitrile. The novel stabilized tall oil nitriles produced by the present invention do not have the disadvantages of ordinary tall oil and are distinguished from ordinary tall oil in being substantially free of emulsion polymerization inhibitors. Although abietonitrile retards polymerization, other more powerful inhibitors of polymerization are present in tall oil and are converted to innocuous components of the product in the course of treatment. They are sufficiently readily converted that their inhibiting property is destroyed by a process of treatment under conditions whereby abietic acid is completely converted to hydro- or dehydroabietic acid and the treated tall oil, substantially free of abietic acid, is subsequently treated with ammonia under conditions that convert the whole stabilized tall oil into a stabilized tall oil nitrile substantially free of abietonitrile.

The following examples are illustrative of the new nitriles and the process of preparing them in accordance with the present invention. All parts given in the examples represent parts by weight.

Example I

Refined tall oil was distilled under 2–5 mm. pressure and 700 parts of the distilled oil, having a bromine number of 99, were hydrogenated in the presence of 70 parts of Raney nickel at a temperature of 225° C. under a hydrogen pressure of 5000 pounds per square inch for 1 hour. The catalyst was removed by filtration while hot. The product was a white crystalline waxy solid having a bromine number of 48.

Five hundred parts of the above hydrogenated tall oil were placed in a reaction vessel and melted. The reaction vessel was outfitted with a sparge tube through which anhydrous ammonia could be introduced into the reaction mixture, a thermometer well for measuring the pot temperature, and a vertical column provided with an electrically heated sleeve, the tube of the column being connected to a water-cooled condenser to condense the gases vaporized during the reaction. The vertical column was heated to and held at about 100°–105° C. during the reaction. Anhydrous ammonia was then introduced into the molten hydrogenated tall oil through the sparge tube and adjusted to a flow rate of 1.4 cubic feet per hour. The temperature was raised to 325°±10° C. during 3.5 hours and held at that temperature for 3 hours. The water of the reaction and oils evolved passed through the vertical reflux condenser and then were condensed. At the end of the heating period the acid number had fallen to 0.4. The crude product was neutralized by adding 0.25 part of potassium hydroxide in 15 parts of ethanol. The crude nitrile was then distilled under vacuum, the fraction boiling at 154°–200° C. at 1–2 mm. of mercury was collected. The nitrile had an acid number of 0 and a nitrogen content of 4.82% which corresponds to a purity of 94.7%. The yield of product obtained was 422 parts which corresponds to a productivity of 0.845 pound of nitrile per pound of hydrogenated tall oil.

*Example II*

Refined tall oil was distilled and 3600 parts of the distilled oil, having a bromine number of 99, were subjected to disproportionation by heating with 180 parts of a palladium on charcoal catalyst, containing 5% palladium, at 237°–240° C. for 30 minutes. The catalyst was removed by filtration while hot. The product was a brown liquid which gradually crystallized on standing and had a bromine number of 40.

Nine hundred twelve parts of the above dehydrogenated tall oil were introduced into a reaction vessel like that described in Example I. Gaseous ammonia was sparged through the dehydrogenated tall oil at a rate of 2.5 cubic feet per hour. The temperature was raised to 325°±10° C. during 3.5 hours and held at that temperature for 4 hours, the vertical column being held at a temperature of 100°–105° C. during the reaction. At the end of the heating period the acid number had dropped to 1.9. The crude nitrile was neutralized with 1.5 parts of potassium hydroxide in 25 parts of ethanol. The nitrile was then distilled under vacuum, the fraction boiling at 150°–220° C. at 1–2 mm. of mercury was collected. This fraction was equal to 657 parts, had an acid number of 0 and contained 4.66% of nitrogen. This corresponds to a purity of 90.7% and a productivity of 0.750 pound of nitrile per pound of dehydrogenated tall oil.

The above dehydrogenated tall oil nitrile was distilled to separate the fatty acid nitriles from the resin acid nitriles. By this means a fraction of fatty acid nitrile having a boiling point of 178°–184° at 1–2 mm. of mercury was obtained which was equal to 51% of the total and contained 4.68% nitrogen which was equivalent to 88.2% nitrile, and a fraction of resin acid nitrile boiling at 194°–198° C. at 1–2 mm. pressure was obtained which was equal to 47.5% of the total and contained 4.62% nitrogen which was equivalent to 92.7% nitrile.

*Example III*

A sample of industrial tall oil containing by ultraviolet absorption analysis about 15% abietic acid was disproportionated by heating with 1 part 5% palladium-on-carbon catalyst per 400 parts tall oil at 260° C. for 4.5 hours until the ultraviolet absorption analysis showed the absence of abietic acid which indicated complete disproportionation of the abietic acid. The yield was substantially quantitative. This disproportionated tall oil after filtration to remove the disproportionation catalyst was then treated with ammonia at 320° C. for 10 hours following the procedure of Example II. The crude disproportionated tall oil nitrile was distilled at 4 mm. pressure and the portion boiling at 186°–220° C. constituting 65% of the crude disproportionated tall oil nitrile was taken as the nitrile fraction. It had by analysis 4.7% nitrogen.

A tall oil nitrile was made from the same batch of industrial tall oil following the procedure of U. S. 2,023,337 to Nicodemus, using a silica gel catalyst in a tube at 330–392° C. A charge of crude tall oil nitrile containing 3.8% nitrogen and about 10% abietyl compounds by ultraviolet absorption analysis was obtained and this was fractionated at 1 mm. pressure in a spinning band column of very low pressure drop. The cuts richest in nitrile boiled at 151°–161° C. and the higher boiling cuts were becoming increasingly greater in acid number. The cuts boiling at 151–161° C. amounted to 24% of the charge. They were combined and washed with 2 grams potassium hydroxide dissolved in 75 ml. alcohol to remove acids.

Both the dehydrogenated tall oil nitrile and the tall oil nitrile prepared according to Nicodemus and purified were tested in the following standard peroxide-catalyzed emulsion polymerization recipe:

| | Parts |
|---|---|
| Butadiene | 71 |
| Styrene | 29 |
| Designated tall oil nitrile | 15.5 |
| Sodium salt of purified dehydrogenated rosin | About 4.7 |
| Potassium persulfate | 0.3 |
| Lorol mercaptan | 0.5 |
| Water | 180 |

The polymerization was carried out at 50° C. by mixing the above ingredients and shaking in a constant temperature bath with periodic sampling for polymer yield. The yield data given in Table 1 show that the dehydrogenated tall oil nitrile is sufficiently free of polymerization inhibitors to produce a commercially acceptable yield of plasticized polymer in slightly better than 16 hours while ordinary tall oil nitrile causes pronounced inhibition of polymerization so as to produce an unacceptable yield of polymer in the same length of time.

*Example IV*

A sample of industrial tall oil from the same batch as used in Example III was hydrogenated over a Raney nickel catalyst at 225° C. and 5000 p. s. i. hydrogen pressure for 1 hour. The bromine number was thereby reduced from 99 to 48.

A sample of this hydrogenated tall oil amounting to 503 parts was contacted with ammonia in large excess as in Example II for 4 hours at 330±5° C. The resulting crude product was then distilled under reduced pressure to obtain a hydrogenated tall oil nitrile with a 4.8% nitrogen content.

A sample of this hydrogenated tall oil nitrile was tested as the plasticizer introduced into a butadiene-styrene polymer prior to the polymerization as in Example III. The test results recorded in Table 1 show that in comparison with ordinary tall oil nitrile, hydrogenated tall oil nitrile is sufficiently free of polymerization inhibitors to produce a commercially acceptable yield of plasticized polymer in slightly better than 16 hours while ordinary tall oil nitrile causes pronounced inhibition of polymerization so as to produce an unacceptable yield of polymer in the same length of time.

TABLE 1

| Plasticizer (15.5 parts/100 parts Monomer) | Hydrocarbon 8.3 hr. | Polymer 12.2 hr. | (Conversion) 16.2 hr. |
|---|---|---|---|
| Tall Oil Nitrile | 1.6 | 5 | 10 |
| Dehydrogenated Tall Oil Nitrile | 17 | 34 | 57 |
| Hydrogenated Tall Oil Nitrile | 23 | 46 | 69 |

Any stabilized tall oil substantially freed of abietic acid by the stabilization process may be used for carrying out the reaction in accordance with this invention to obtain applicant's stabilized tall oil acid nitriles. The dehydrogenated tall oil is obtained by the dehydrogenation or disproportionation of tall oil. The dehydrogenation or disproportionation reaction is carried out by contacting the tall oil at an elevated temperature with an active hydrogenation catalyst in the absence of added hydrogen to effect a dehydrogenation or disproportionation reaction until substantially all of the abietic acid is disproportionated. Catalysts such as palladium, platinum, nickel, copper chromite, etc., are suitable. The catalysts may be supported on a carrier such as granular alumina, fibrous asbestos or activated charcoal. Dehydrogenation or disproportionation with a palladium catalyst, for example, may be conducted either by a batchwise or continuous procedure. Thus, the tall oil may be agitated with about 5% to about 20% by weight of a palladium catalyst supported on activated carbon (1-2% palladium) at about 150° C. to about 300° C. for about 1 hour to about 5 hours. In the continuous process the tall oil flows over the supported palladium catalyst at a temperature within the range of about 225° C. to about 300° C. to provide a contact time of about ¼ hour to about 1 hour.

Hydrogenated tall oil may be obtained by reducing the unsaturation of tall oil by contacting the tall oil in a fluid state with hydrogen in the presence of an active base metal hydrogenation catalyst such as activated nickel, Raney nickel, copper chromite, cobalt, etc., under pressure, for example a hydrogen pressure of 200 to 15,000 pounds per square inch and at a temperature of about 125° C. to about 225° C. for about ½ hour to about 5 hours until substantially all of the abietic acid therein has been hydrogenated at least to the extent of one double bond. A highly active platinum or palladium oxide catalyst may also be employed, in which case the reaction is usually carried out at room temperature under a relatively low hydrogen pressure and in the presence of an inert reaction medium such as acetic acid. Any other variations of the hydrogenated reaction may be utilized.

Any convenient form of apparatus may be used in carrying out the process in accordance with this invention. The apparatus should be designed to facilitate the rapid removal of water as fast as it is formed. The use of the vertical column as described in the foregoing examples is advantageous in that it enables a rapid removal of water without loss of the nitriles. A column through which the ammonia, but not the tall oil, passes may be packed with a dehydrating agent such as silica gel to dehydrate the gas before recirculation if desired. It is usually desirable to maintain this column at a temperature of at least 100° C. so that the water will pass through the column and be removed from the reaction mixture.

Any means of contacting the hydrogenated or dehydrogenated tall oil, in liquid phase, with ammonia may be used. The tall oil may be dissolved in an inert solvent, if desired. However, the reaction is readily carried out in the absence of a solvent by passing the ammonia directly into the tall oil. The use of a sparge tube usually provides for sufficient contact between the ammonia and tall oil. The amount of ammonia used in the reaction depends upon the efficiency of the ammonia-tall oil contact. The ammonia may be recycled, if desired, to improve the consumption efficiency. In any event it should be at least the quantity necessary to react completely with the tall oil acids present. The reaction may be carried out under pressure or under a slight vacuum. However, it is conveniently carried out at atmospheric pressure. If desired, the ammonia gas may be diluted with any inert gas such as nitrogen.

The reaction in accordance with this invention may be carried out at a temperature of about 250° C. to about 400° C. and preferably is carried out at about 315° C. to about 335° C.

Ammonia is passed into the stabilized tall oil acids in liquid phase until the conversion of both fatty acids and stabilized resin acids to nitriles is essentially complete. Usually, it is convenient to add ammonia until the acid number of the reaction mixture is below 5. However, the reaction may be carried out until the amount of unreacted acid is negligible. Any unreacted acid may be neutralized by adding the theoretical amount of inorganic alkali. Any inorganic alkali such as sodium hydroxide, potassium hydroxide, calcium hydroxide, or a mixture of calcium hydroxide and calcium acetate, etc., may be used for this purpose. A convenient method of performing this step is to add an alcoholic solution of the alkali. Another method of purification is to extract the unreacted acid from the crude product using an aqueous alcoholic solution of alkali for the extraction.

The neutral reaction mixture may then be distilled in vacuo to give an acid-free product. The reaction mixture may be distilled without neutralization, but in this case, if an acid-free product is desired, it is necessary to carry out the distillation with very careful fractionation.

The stabilized tall oil nitriles prepared from stabilized tall oil acids such as occur in hydrogenated or dehydrogenated or disproportionated tall oil are mononitriles corresponding in structure to a nitrile produced by substitution of the —COOH group of the stabilized tall oil acids by a —CN group.

In order to obtain the advantages of this invention to the maximum extent, the stabilized tall oil used as a starting material, whether hydrogenated tall oil or dehydrogenated tall oil, is substantially free of abietic acid which forms abietonitrile by reaction with ammonia. The presence of abietonitrile in the stabilized tall oil nitriles is objectionable since it impairs the value of the stabilized tall oil nitriles as plasticizers for polymeric materials.

In the conversion of stabilized tall oil acids into the corresponding nitriles by reaction with ammonia at temperatures within the range of about 250°–350° C., abietyl compounds, if present in small amounts below about 3%, disappear in the process and are not to be found in the product as abietonitrile. The disappearance may be attributed to known side reactions of abietic acid such as polymerization, decarboxylation, or condensation of ammonia with the double bonds of the abietyl compound. The conversion of any abietic acid in the stabilized tall oil into higher molecular weight products will cause a reduction in yield on distillation of the product. However, the by-products, if left in the stabilized tall oil nitrile, do not impair the product from the standpoint of inhibiting the emulsion polymerization process in which they are used as plasticizers. Similarly, any other polymerization inhibitors normally present, patricularly in dehydrogenated rosin, are converted to by-products in the treatment with ammonia which greatly reduces or destroys their inhibiting property.

The stabilized tall oil acid nitriles, prepared from hydrogenated and dehydrogenated tall oil, distill readily in vacuo to give pale yellow oils which partially crystallized. They may also be fractionally distilled to separate the fatty acid nitriles from the stabilized resin acid nitriles, if desired. These nitriles of stabilized tall oil prepared in accordance with this invention besides being excellent plasticizers are valuable as intermediates in the preparation of the corresponding amides and amines.

This application is a continuation-in-part of application, Serial Number 714,664, filed December 6, 1946, now abandoned.

What I claim and desire to protect by Letters Patent is:

1. A stabilized tall oil nitrile of the group consisting of dehydrogenated tall oil nitrile and hydrogenated tall oil nitrile, substantially free of emulsion polymerization inhibitors and abietonitrile.

2. Dehydrogenated tall oil nitrile substantially free of emulsion polymerization inhibitors and abietonitrile.

3. Hydrogenated tall oil nitrile substantially free of emulsion polymerization inhibitors and abietonitrile.

4. The process of preparing a stabilized tall oil nitrile substantially free of emulsion polymerization inhibitors which comprises reacting a stabilized tall oil of the group consisting of dehydrogenated tall oil and hydrogenated tall oil, in which the abietic acid content has been substantially completely eliminated by the stabilization process, in liquid phase with gaseous ammonia in the absence of a dehydration catalyst and continuously removing the water from the reaction as it is formed until substantially the whole stabilized tall oil is converted to the nitrile.

5. The process of preparing a stabilized tall oil nitrile substantially free of emulsion polymerization inhibitors which comprises reacting a stabilized tall oil of the group consisting of dehydrogenated tall oil and hydrogenated tall oil, in which the abietic acid content has been substantially completely eliminated by the stabilization process, in liquid phase at a temperature of about 250° C. to about 400° C. with gaseous ammonia in the absence of a dehydration catalyst and continuously removing the water from the reaction mixture as it is formed until substantially the whole stabilized tall oil is converted to the nitrile.

6. The process of preparing a stabilized tall oil nitrile substantially free of emulsion polymerization inhibitors which comprises reacting dehydrogenated tall oil in which the abietic acid content has been substantially completely eliminated by the dehydrogenation process in liquid phase at a temperature of about 250° C. to about 400° C. with gaseous ammonia in the absence of a dehydration catalyst and continuously removing the water from the reaction mixture as it is formed until substantially the whole dehydrogenated tall oil is converted to the nitrile.

7. The process of preparing a stabilized tall oil nitrile substantially free of emulsion polymerization inhibitors which comprises reacting hydrogenated tall oil in which the abietic acid content has been substantially completely eliminated by the hydrogenation process in liquid phase at a temperature of about 250° C. to about 400° C. with gaseous ammonia in the absence of a dehydration catalyst and continuously removing the water from the reaction mixture as it is formed until substantially the whole hydrogenated tall oil is converted to the nitrile.

STEARNS T. PUTNAM.

REFERENCES CITED

The following references are of record in the file of this patent:

UNITED STATES PATENTS

| Number | Name | Date |
|---|---|---|
| 2,371,230 | Dressler | Mar. 13, 1945 |
| 2,413,009 | Taussky | Dec. 24, 1946 |
| 2,434,656 | Humphrey | Jan. 20, 1948 |
| 2,461,349 | Ralston | Feb. 8, 1949 |
| 2,503,268 | Hasselstrom et al. | Apr. 11, 1950 |
| 2,510,297 | Rummelsburg | June 6, 1950 |